United States Patent [19]
Warner et al.

[11] 4,280,779
[45] Jul. 28, 1981

[54] METHOD AND APPARATUS FOR EMPTYING THE CONTENTS OF A CONTAINER

[75] Inventors: Lee A. Warner; Michael H. Willcutt, both of Raleigh, N.C.

[73] Assignee: Cotton Incorporated, New York, N.Y.

[21] Appl. No.: 56,806

[22] Filed: Jul. 11, 1979

[51] Int. Cl.$^3$ .................................... B65G 65/34
[52] U.S. Cl. ............................ 414/420; 298/17.6; 298/18; 414/423; 414/424
[58] Field of Search ............... 414/346, 358, 364, 371, 414/373, 382, 384, 392, 393, 397, 418–421, 423, 424, 468, 470; 298/17.5, 17.6, 17.8, 18; 105/261 R, 264, 268

[56] References Cited

U.S. PATENT DOCUMENTS

| | | | |
|---|---|---|---|
| 527,117 | 10/1894 | Long | 414/358 |
| 1,579,927 | 4/1926 | Griess | 414/358 |
| 1,768,847 | 7/1930 | Kidder | 414/358 |
| 2,179,100 | 11/1939 | Ramsay | 414/358 |
| 2,374,009 | 4/1945 | Grossmith et al. | 414/358 |

FOREIGN PATENT DOCUMENTS

| | | | |
|---|---|---|---|
| 1382936 | 11/1964 | France | 414/419 |
| 240600 | 10/1925 | United Kingdom . | |
| 292302 | 6/1928 | United Kingdom . | |

*Primary Examiner*—Andres Kashnikow
*Attorney, Agent, or Firm*—Burns, Doane, Swecker & Mathis

[57] ABSTRACT

A container dumping mechanism includes first and second sides. A carrier is positioned on the frame for movement relative thereto. The carrier includes a mechanism for supporting a container to be dumped. A dumping assembly is operably connected to the carrier and includes an actuating mechanism which is selectively actuable in first and second modes. In the first mode, the actuating mechanism is actuable to raise and generally invert the carrier at the first side of the frame to dump the contents of the container over the first side. In the second mode, the actuating mechanism is actuable to raise and generally invert the carrier at the second side of the frame to dump the contents of the container over the second side. The actuating mechanism is further actuable in a third mode for rotating the carrier essentially in place about a longitudinal axis to dump the contents of the container directly therebeneath. The actuating mechanism comprises an extensible/retractible boom comprising telescoped inner and outer portions. A cable take-up mechanism is connected to the cable for shortening the effective length thereof to extend the outer boom portion and cause the carrier to rotate.

32 Claims, 22 Drawing Figures

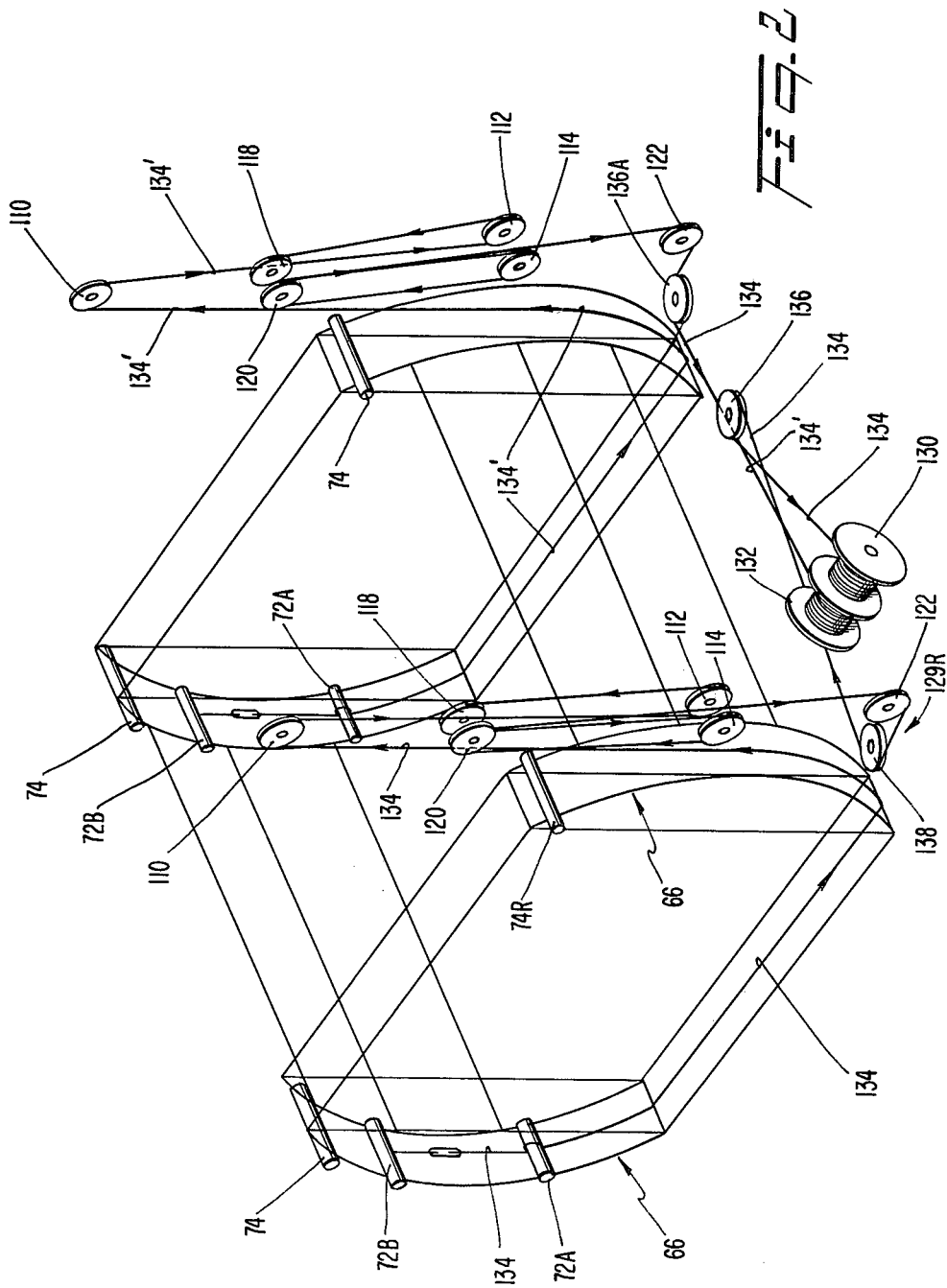

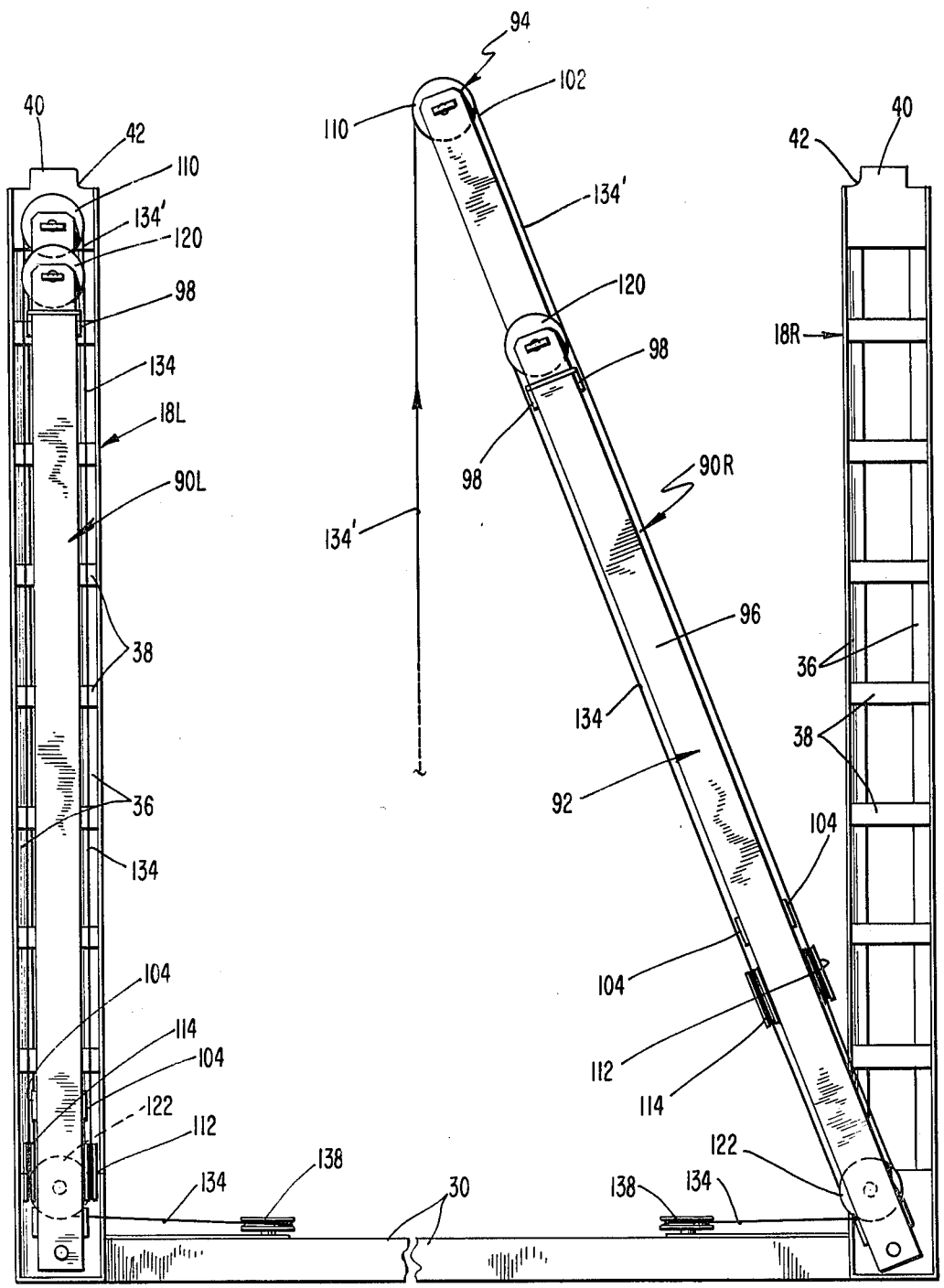

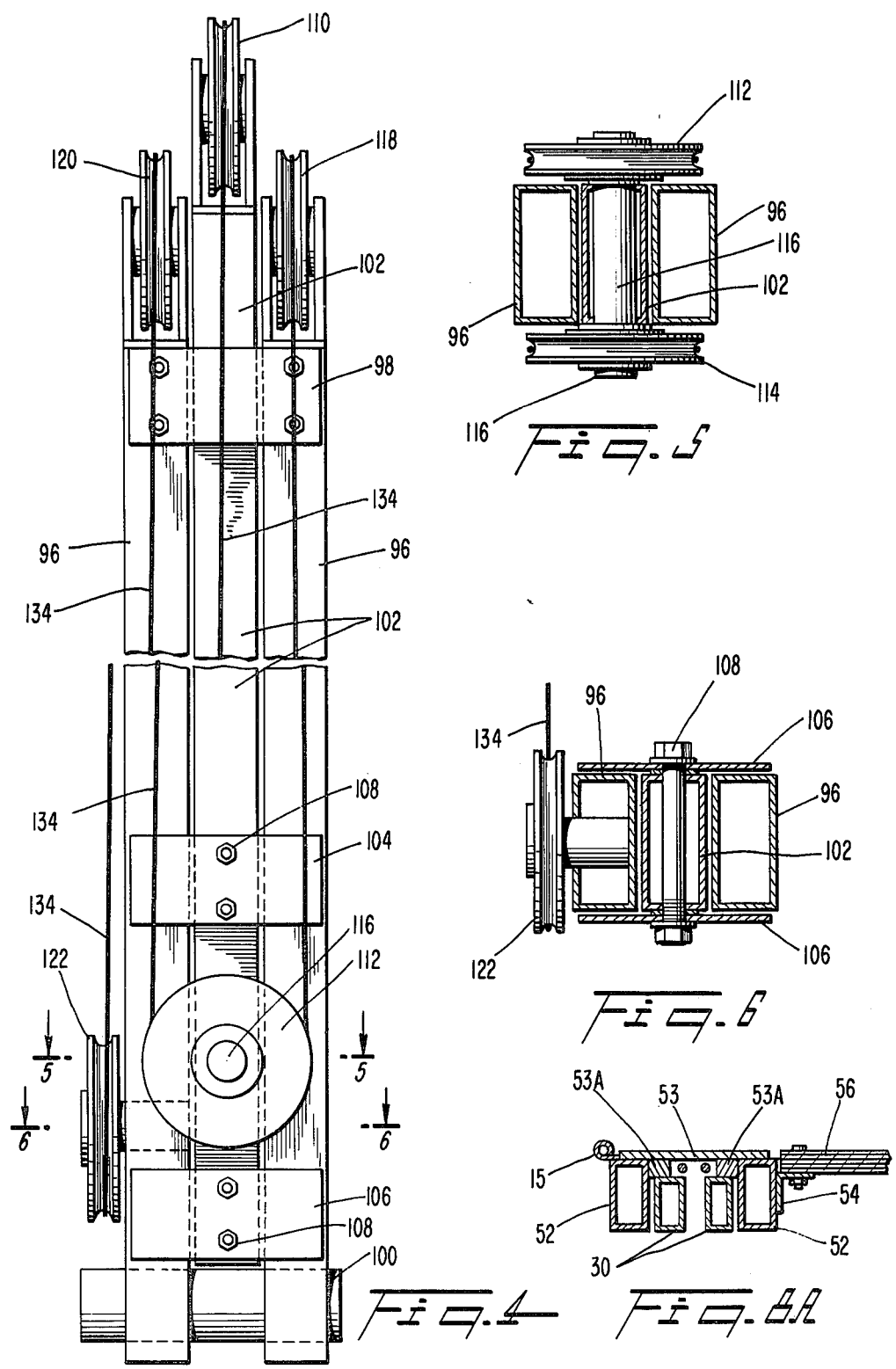

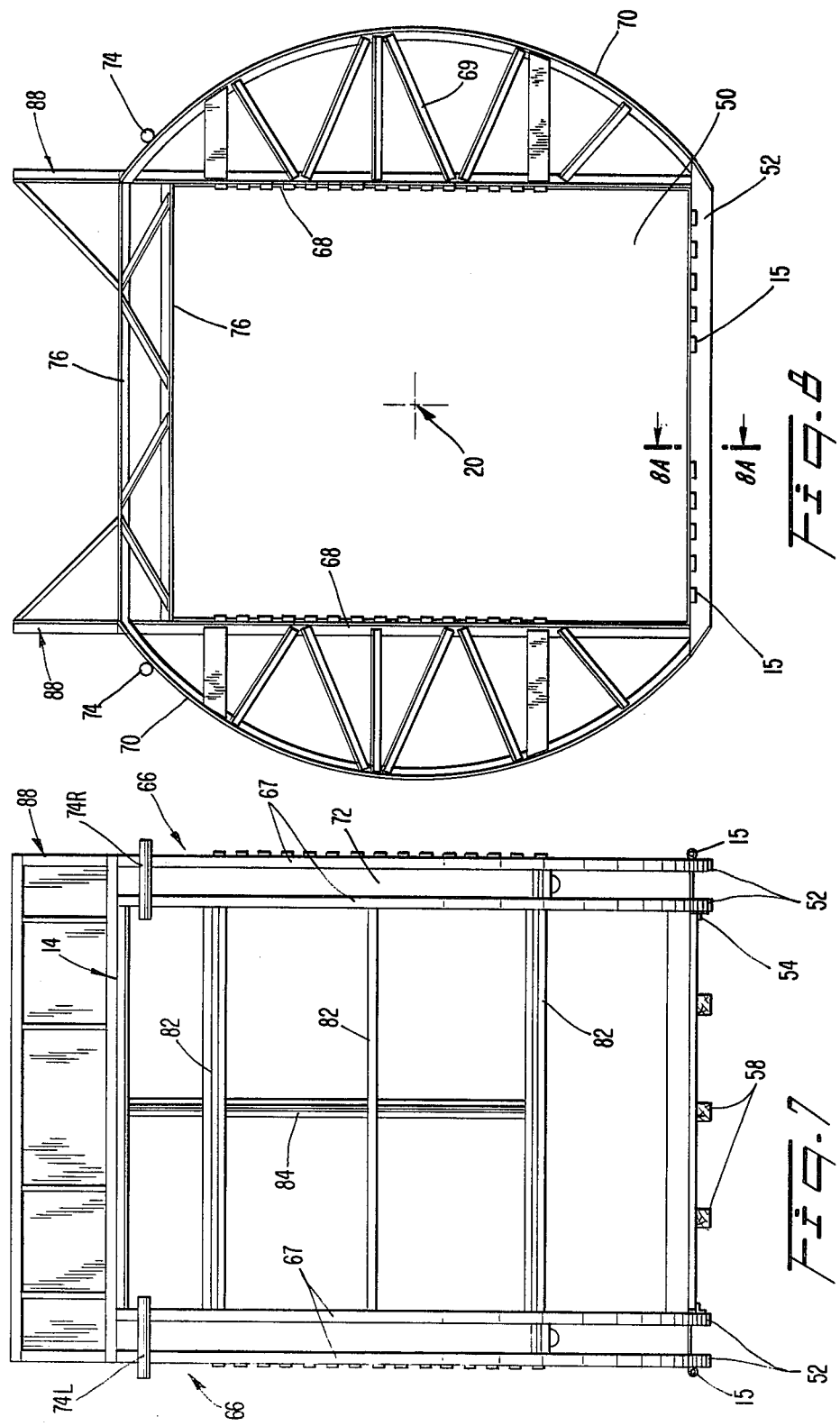

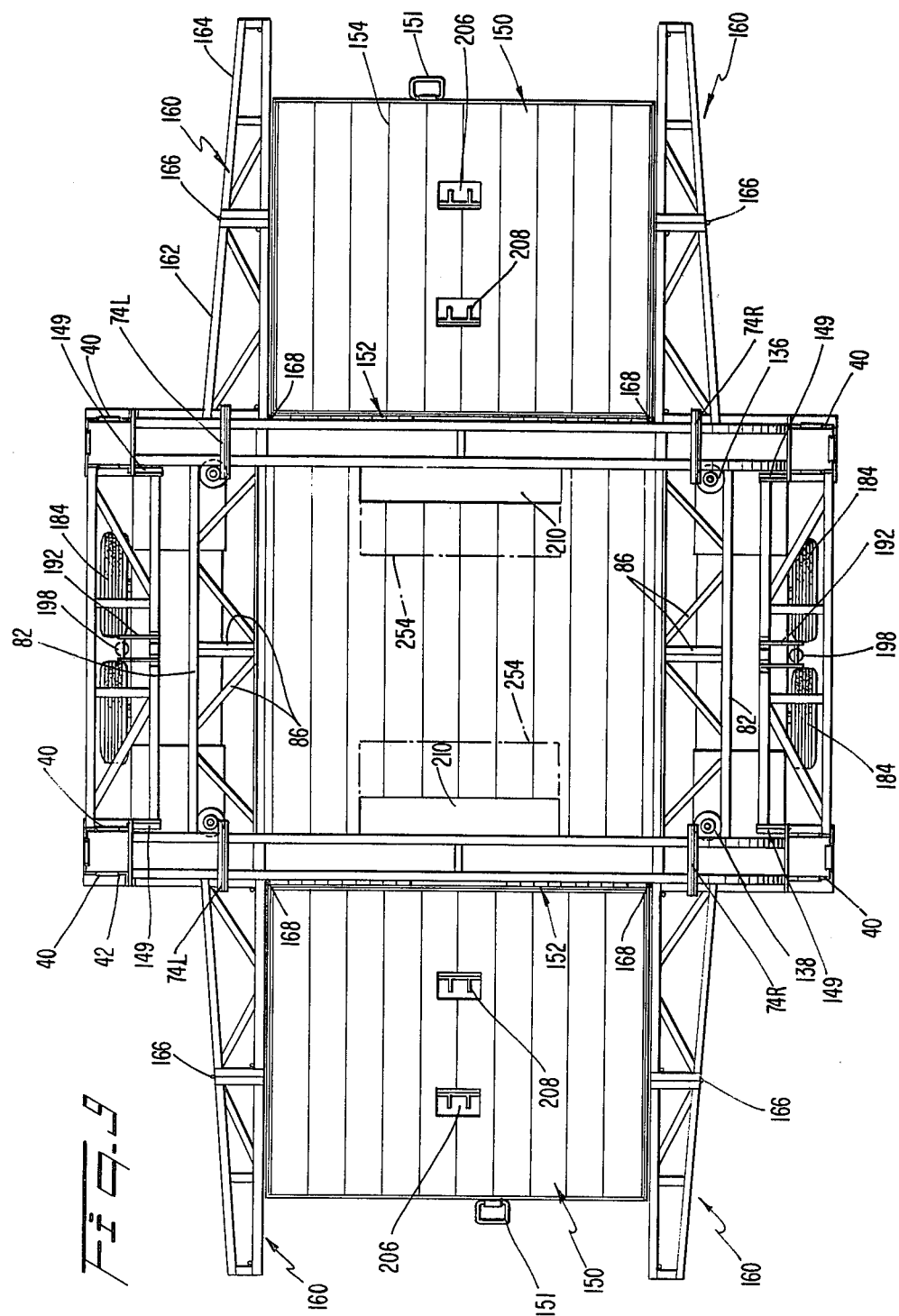

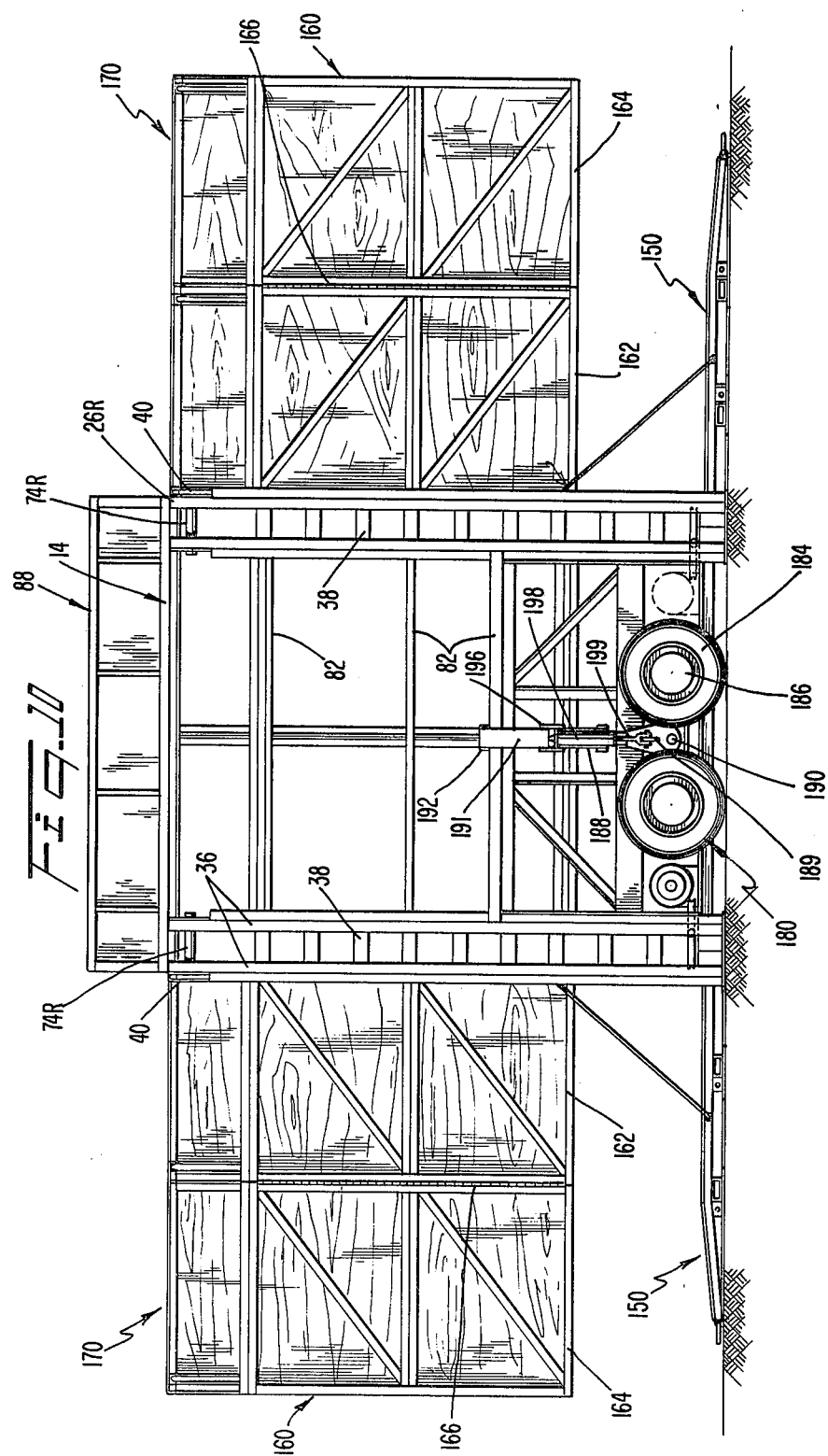

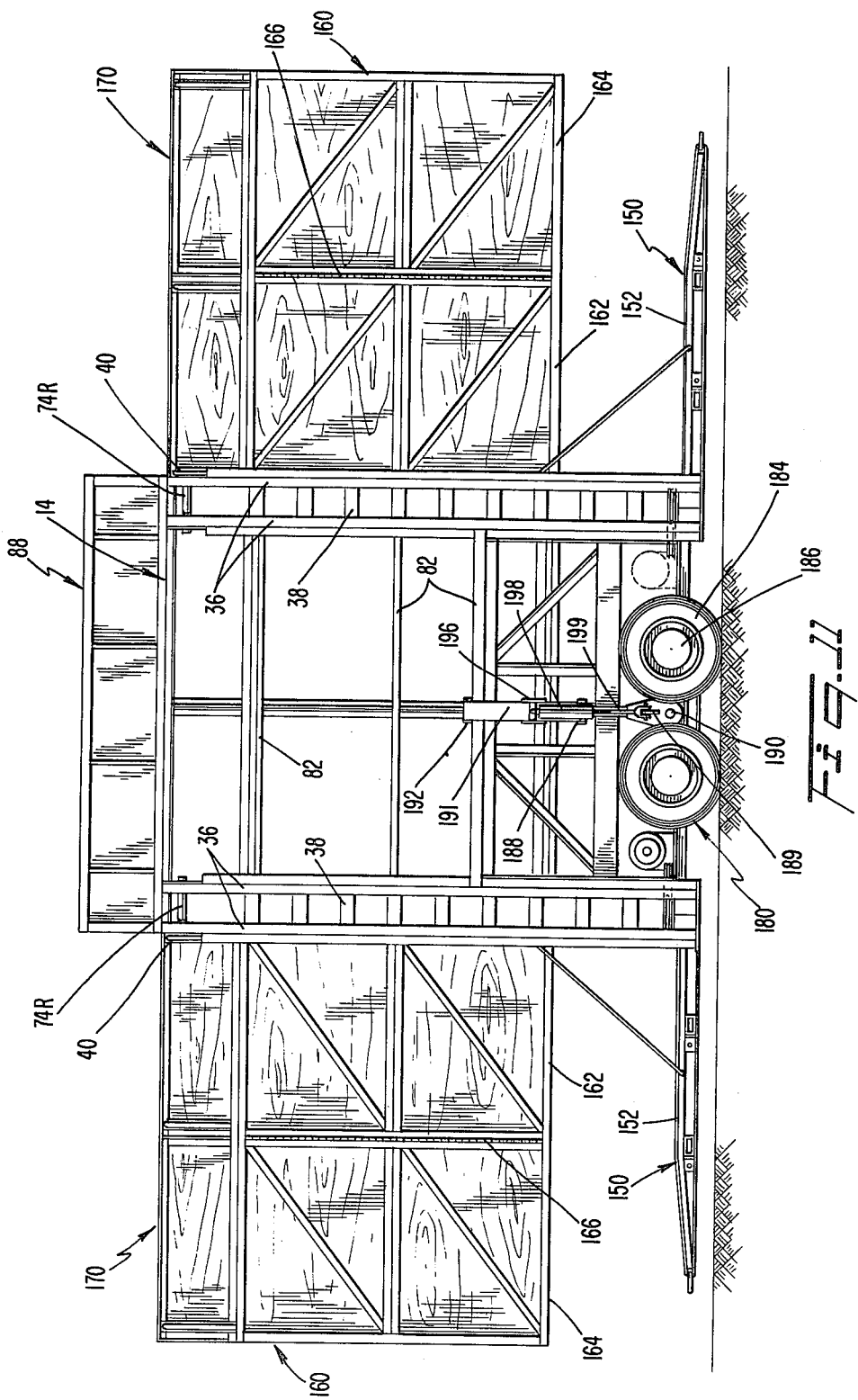

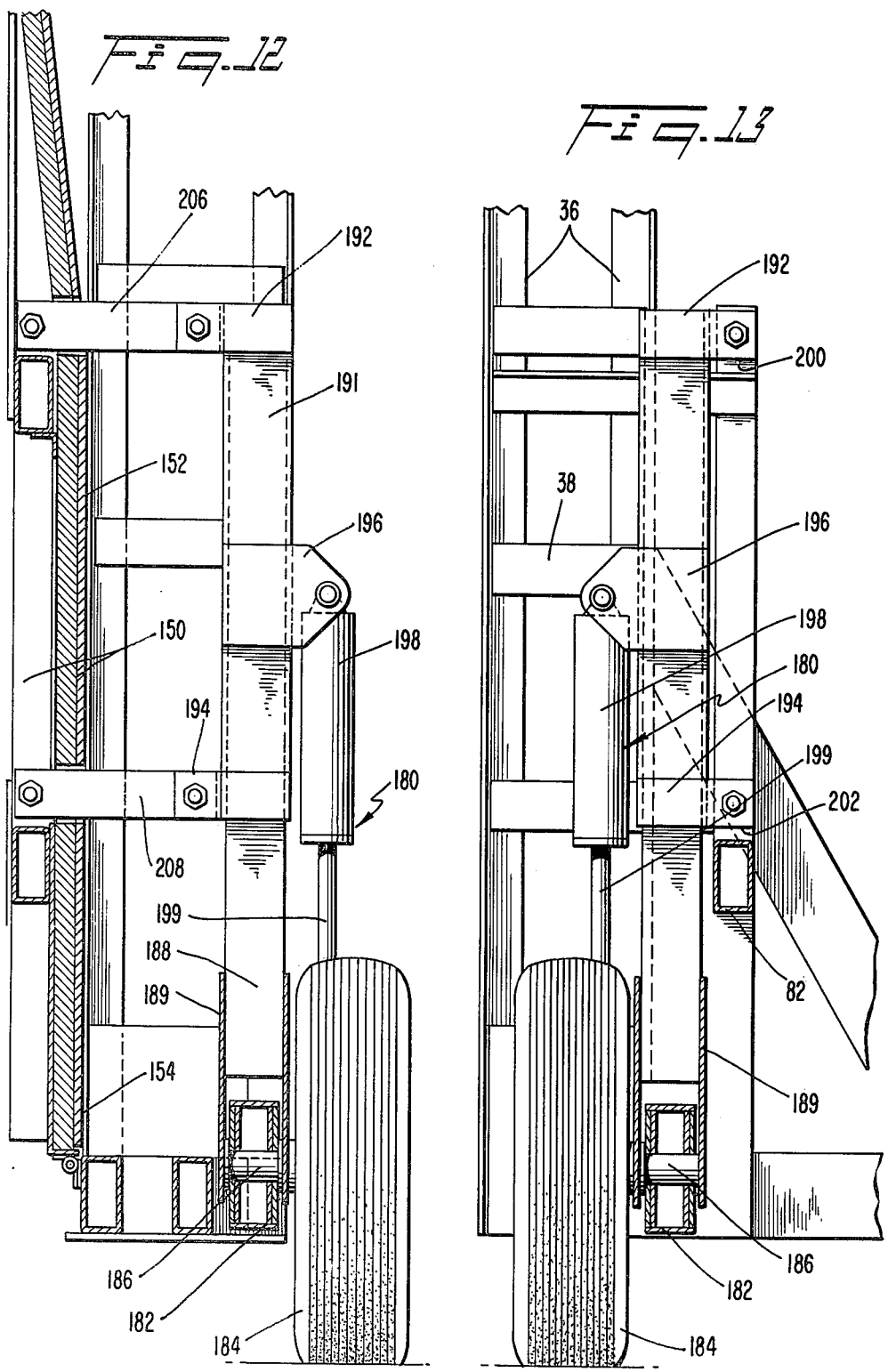

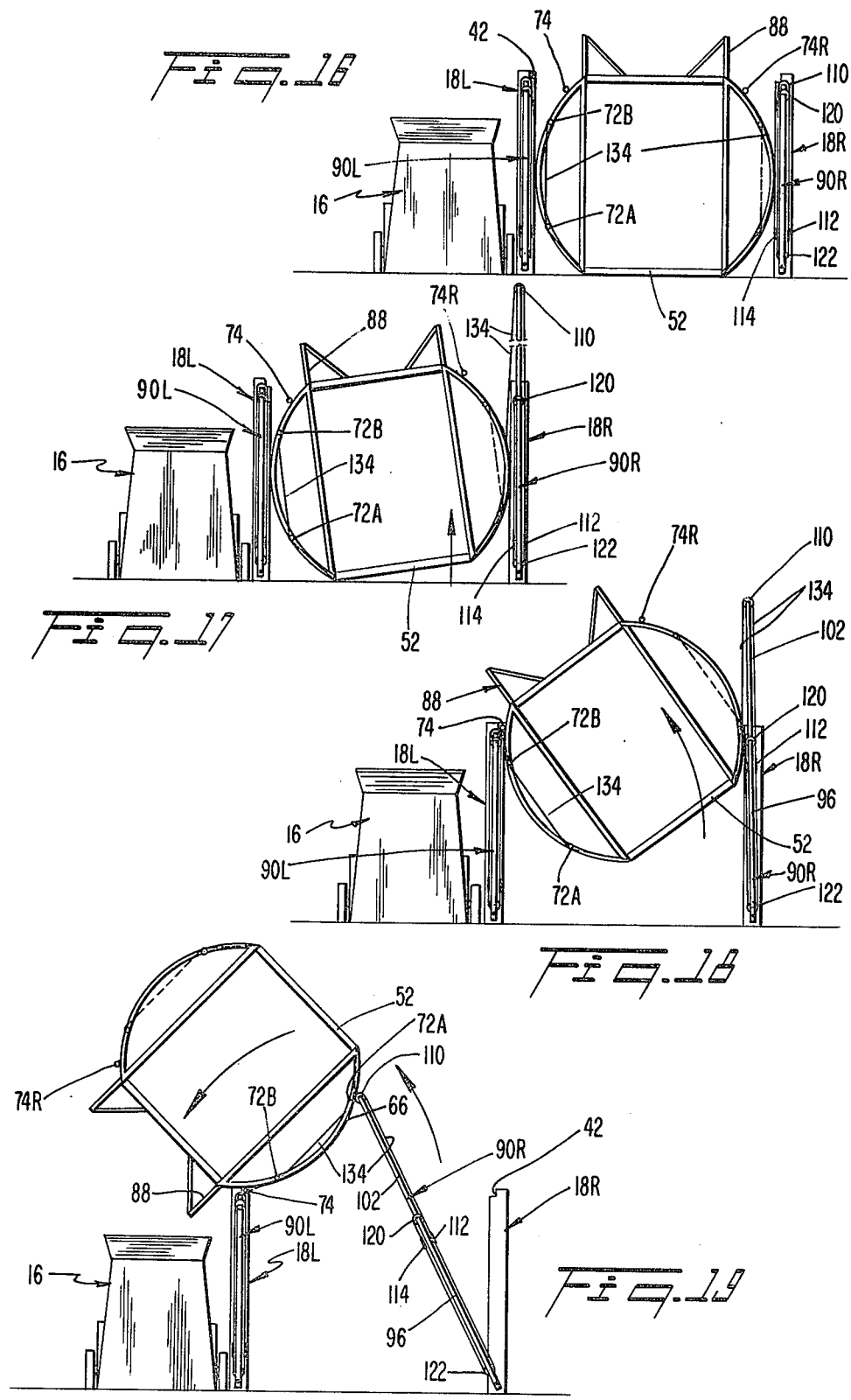

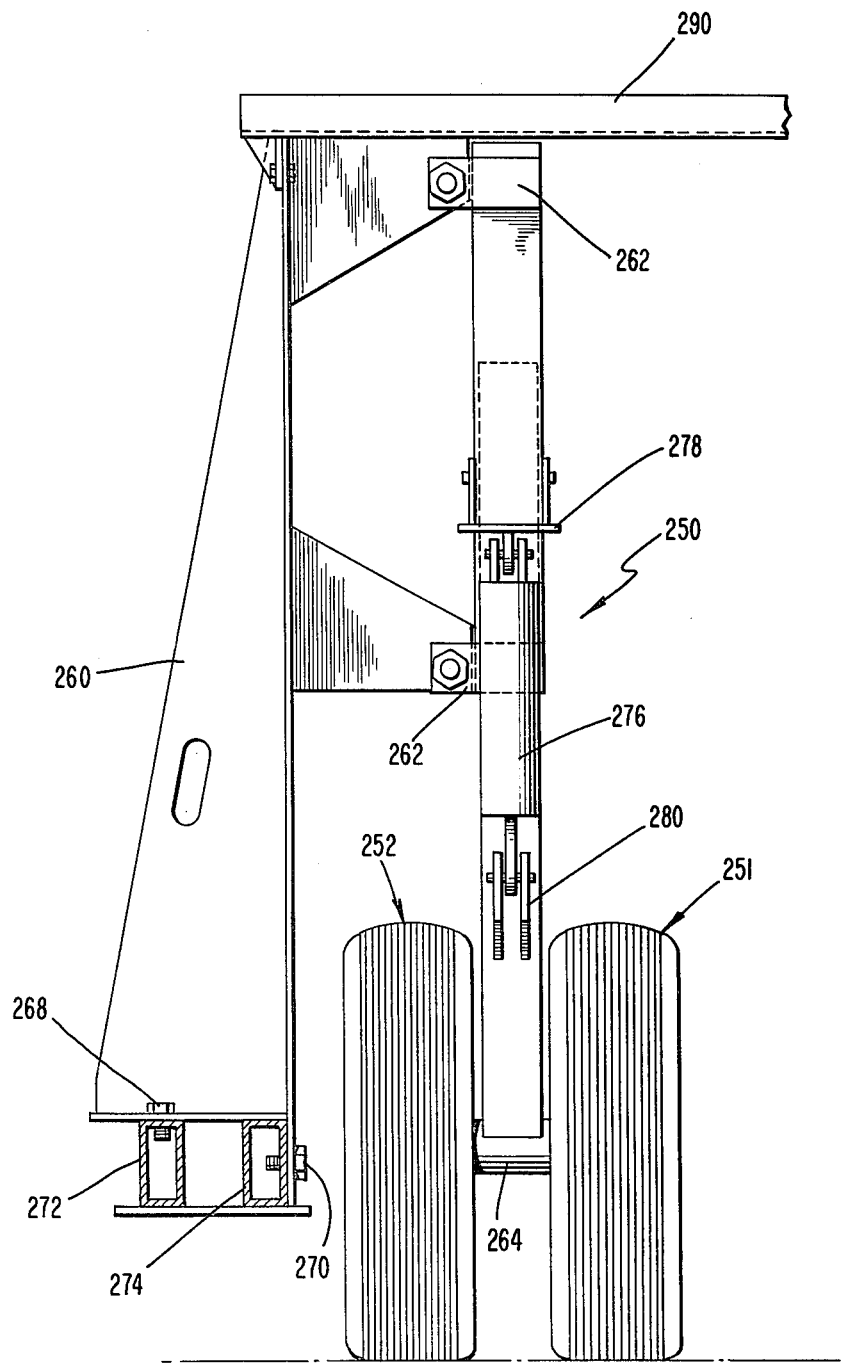

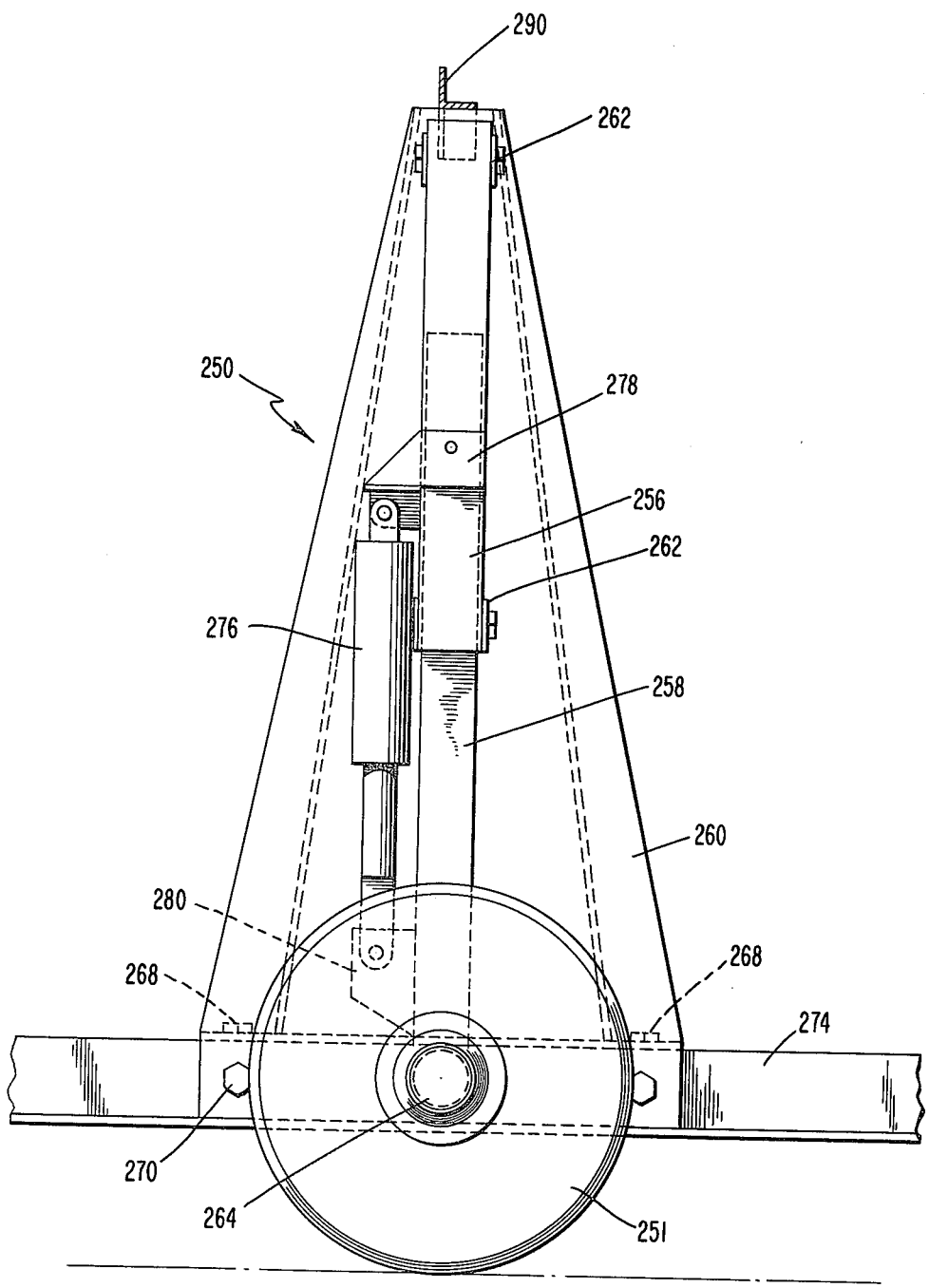

METHOD AND APPARATUS FOR EMPTYING THE CONTENTS OF A CONTAINER

BACKGROUND AND OBJECTS OF THE INVENTION

The present invention relates to methods and apparatus for unloading the contents of a container and, in particular, to the transfer of seed cotton from a mobile wagon to a cotton module-forming mechanism.

During a typical cotton harvest, not all of the cotton is immediately transported to the ginning facility. Rather, some cotton is stored in the form of compacted stacks for later handling. In this fashion, the operating demands placed on the ginning facility can be distributed over a longer period to maximize efficiency.

The stacking of seed cotton for later use has heretofore been accomplished in some instances by a so-called cotton module builder, such as, for example, the type described in U.S. Pat. No. 3,749,003 issued to L. H. Wilkes et al on July 31, 1973 and assigned to the assignee of this invention. Such a module builder comprises a wheeled structure having two side walls, a front wall, and a back wall. The structure is open at the top to enable cotton to be dumped therein from a transport wagon or harvester. A compacting mechanism is mounted on the structure and is operable to uniformly press the cotton into a tightly packed stack. Thereafter, the rear wall is raised and the module builder is advanced, leaving the stack behind in self-standing condition.

Various systems have been proposed for transferring cotton from the transport wagon to the module builder. For example, one proposal involves the use of an air suction conveyor for lifting seed cotton from the wagon and conveying it to a holding basket located above the module builder. When the basket becomes filled, it is to be dumped into the module builder.

Another proposal involves the use of a vehicle-mounted suction conveyor which is to suck cotton from the wagon and deposit it directly into the module builder. Such a conveyor could be transported from site to site to service different module builders.

Yet another proposal involves the use of a mechanism for raising and tilting the transport wagon to dump seed cotton directly from the wagon into the module builder. Such mechanism would comprise an L-frame including a horizontal floor and an upright side. The side is to be connected at its upper end to a stationary base by means of a horizontal pivot to enable the L-shaped frame to be swung upwardly and downwardly. In practice, a transport wagon is to be driven onto the floor of the L-frame and anchored thereto. Thereafter, a crane is to hoist the L-frame about its pivot connection to raise the wagon and tilt it over the module builder, whereby the cotton would gravitate from the wagon. Other similar systems have been proposed which would utilize massive hydraulic cylinders in lieu of a crane to lift and tip the wagon.

A system has also been proposed in which the transport wagon would be driven onto a carrier and anchored thereto. The carrier would then be rotated on rollers about its own longitudinal horizontal axis to dump the cotton into a pit located beneath the carrier.

Additional proposals are described in U.S. Pat. No. 527,117 issued to Long on Oct. 9, 1894; No. 1,579,927 issued to Griess on Apr. 6, 1926; No. 1,768,847 issued to Kidder on July 1, 1930; No. 2,179,100 issued to Ramsay on Nov. 7, 1939; and No. 2,374,009 issued to Grossmith et al on Apr. 17, 1945, as well as in British Pat. Nos. 240,600 and 292,302 issued to General Electric Company Limited on Oct. 8, 1925 and June 21, 1928, respectively. In each of those patents a carrier is mounted on a framework for rolling movement along a surface of the frame. Generally, such surfaces are either horizontal or slightly inclined (see U.S. Pat. No. 2,374,009). A cable mechanism is provided for rolling the carrier along the surface so that a container mounted on the carrier becomes generally inverted over a receiver container. Generally, the mechanisms described in those patents are capable of dumping to only one side of the frame. In U.S. Pat. No. 2,374,009 it is disclosed that the frame may be turned around in order that dumping may be achieved to the opposite side. This of course involves considerable maneuvering of the mechanism to accomplish. Also, the mechanisms described in those patents are of considerable height due to the particular cable mechanisms provided, and are of considerable width due to the generally horizontal orientation of the roll surfaces of the frame. Accordingly, highway transporting of the mechanism would involve considerable difficulty.

Accordingly, it is an object of the present invention to minimize or obviate problems of the type discussed above.

It is another object of the invention to provide novel methods and apparatus for emptying the contents of containers.

It is a further object of the invention to enable a container to be dumped by a mechanism which is portable and of relatively short height and narrow width, preferably with a maximum width of twelve feet.

It is an additional object of the invention to provide a mechanism for dumping a cotton wagon, which mechanism is portable on the gin yard.

It is another object of the invention to enable a container to be rolled upwardly along a substantially vertical surface to maximize the height from which the container is emptied.

It is still another object of the invention to provide novel container dumping methods and apparatus whereby a container may be dumped selectively to either side of a framework without the need for reorienting the framework.

It is an additional object of the invention to provide novel container dumping methods and apparatus whereby a container may be selectively dumped to either side or directly beneath itself.

BRIEF SUMMARY OF THE INVENTION

The objects of the present invention are achieved by means of a novel container dumping mechanism and method of dumping wherein a frame is provided having first and second sides. A carrier is positioned on the frame for movement relative thereto. The carrier includes means for supporting a container to be dumped. A dumping assembly is operably connected to the carrier and includes an actuating mechanism which is selectively actuable in first and second modes. In the first mode, the actuating mechanism is actuable to raise and generally invert the carrier at the first side of the frame to dump the contents of the container over the first side. In the second mode, the actuating mechanism is actuable to raise and generally invert the carrier at the second side of the frame to dump the contents of the container over the second side.

Preferably, the actuating mechanism is further actuable in a third mode for rotating the carrier essentially in place about a longitudinal axis to dump the contents of the container directly therebeneath.

Preferably, the actuating means comprises an extensible/collapsible boom comprising telescoped inner and outer portions. A cable extends around the boom and is connected to the carrier. A cable take-up mechanism is connected to the cable for shortening the effective length thereof to extend the outer boom portion and cause the carrier to rotate.

BRIEF DESCRIPTION OF THE DRAWING

Other objects and advantages of the present invention will become apparent from the subsequent detailed description of a preferred embodiment thereof, in connection with the accompanying drawing in which like numerals designate like elements and in which:

FIG. 2 is a schematic depiction of an actuating cable mechanism according to the present invention;

FIG. 3 is an end elevational view of a dumping mechanism according to the present invention with the carrier drum removed for clarity, and with a boom mechanism at one side of the dumping mechanism being depicted in a slightly extended and pivoted condition;

FIG. 4 is a side elevational view of a retracted boom mechanism according to the present invention;

FIG. 5 is a cross-sectional view of the boom mechanism taken along line 5—5 in FIG. 4;

FIG. 6 is a cross-sectional view of the boom mechanism taken along line 6—6 in FIG. 4;

FIG. 7 is a side elevational view of a carrier drum according to the present invention;

FIG. 8 is an end elevational view of the carrier drum;

FIG. 8A is a cross-sectional view of a portion of the carrier drum taken along the line 8A of FIG. 8;

FIG. 9 is a plan view of the dumping mechanism in a condition operable to receive a container;

FIG. 10 is a side elevational view of the dumping mechanism depicted in FIG. 9;

FIG. 11 is a side elevational view of the dumping mechanism which is in a slightly raised condition for transport within a yard;

FIG. 12 is an enlarged view of a support wheel assembly located in a position also illustrated in FIGS. 14–15 for highway transport of the dumping mechanism;

FIG. 13 is an enlarged view of the support wheel assembly located in a position also depicted in FIGS. 10 and 11 to accommodate movement of the dumping mechanism within a yard;

FIGS. 16 through 19 are schematic views depicting the operational sequence wherein the carrier drum is raised from a rest position to a generally inverted position above a receiver container;

FIG. 20 is a side elevational view taken in the direction of transport travel of the dumping mechanism, of an alternate embodiment of a ground support; and FIG. 21 is a side elevational view of the ground support depicted in FIG. 20 from a direction oriented ninety degrees relative to the transport direction.

DETAILED DESCRIPTION OF A PREFERRED EMBODIMENT OF THE INVENTION

Figure 1:
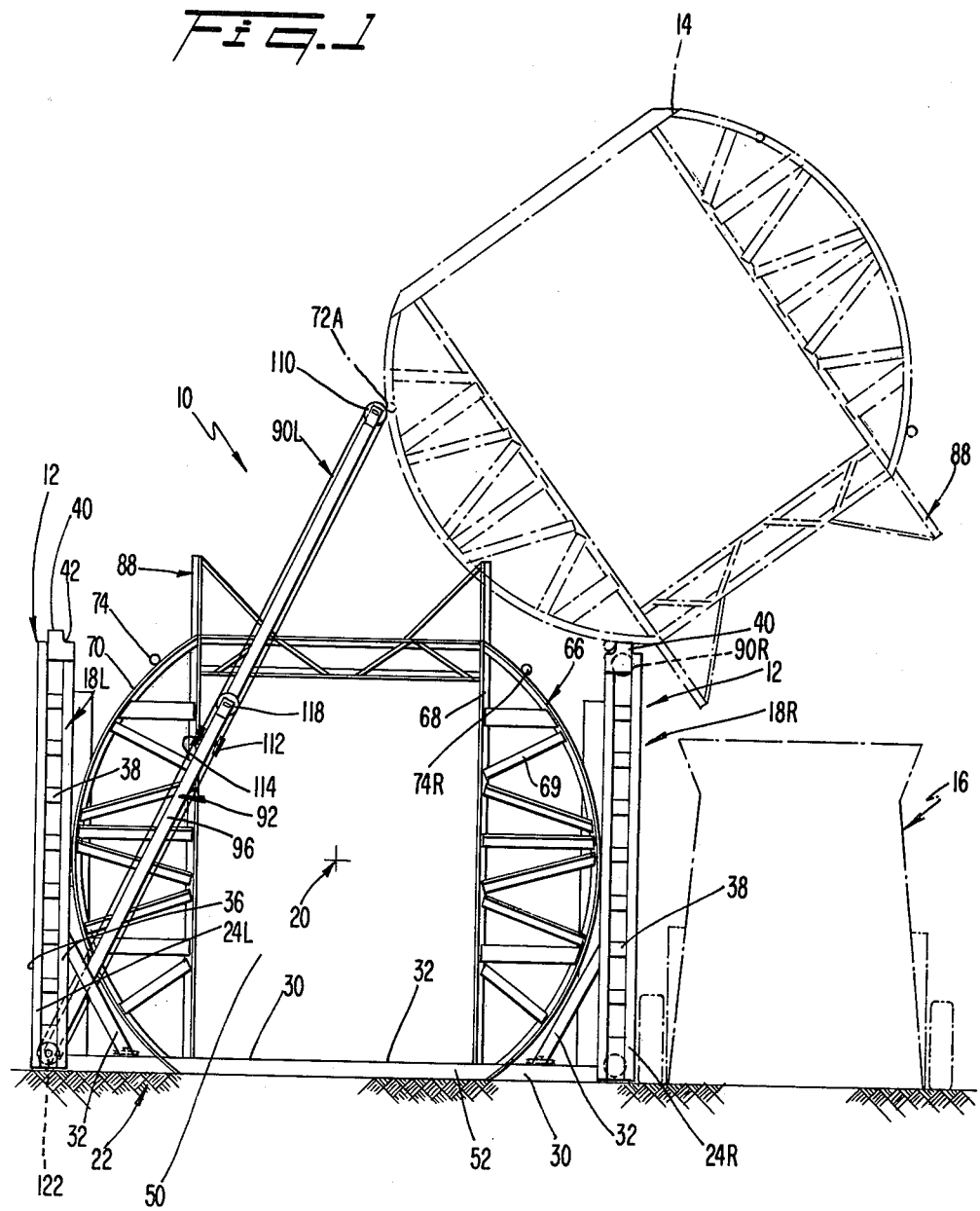
FIG. 1 is an end elevational view of a container dumping mechanism according to the present invention wherein a carrier component thereof is in a rest position (solid lines) and a generally inverted dumping position (broken lines)

A preferred form of dumping mechanism 10 according to the present invention comprises a stationary frame 12 and a carrier drum 14 seated on the frame 12 and movable relative thereto (FIG. 1). In practice, a mobile wheeled container in the form of a wagon filled with seed cotton is driven into the carrier 14 and anchored thereto. Then the carrier 14, together with the wagon, is raised and tilted to dump the seed cotton into a module former 16 located adjacent a side 18R (or 18L) of the frame 12 (see the broken line illustration in FIG. 1). As will be described hereafter in detail, the carrier is operable to dump selectively to either side 18R, 18L of the frame, or the carrier may simply be rotated in-place about its own longitudinal horizontal axis 20 to dump the seed cotton into a pit or conveyor (not shown) located directly beneath the frame 12.

With attention now directed particularly to FIGS. 1, 3, 7, 8 and 13, the stationary frame 12 comprises a base portion 22 and an upright post 24R, 24L and 26R, 26L at each corner of the base portion. Thus, a pair of posts 24L, 24R are located at one end of the frame as depicted in FIG. 1, while the other two posts 26R, 26L are located at the other end of the frame, the "ends" of the frame being spaced in the direction of the axis 20 of the carrier 14. Accordingly, one pair of posts 24R, 26R is located at one side 18R of the frame 12, while the other pair of posts 24L, 26L is located at the other side 18L of the frame 12, the "sides" of the frame being spaced in a direction laterally of the axis 20.

The base portion 22 includes front and rear pairs of horizontal beams 30 (front beams shown in FIG. 8A) extending between the posts 24L, 24R and 26L, 26R, respectively, at opposite ends of the frame. The beam segments 30 aid in supporting and stabilizing the frame and, as will be discussed, serve to position and orient the carrier in the "rest" position of the latter. Reinforcing braces 32 extend between the base beams 30 and the respective posts.

The upstanding posts 24R,L, 26R,L each comprise four upstanding legs 36, respective pairs of which are interconnected by vertically spaced, horizontal braces 38. Each post thus forms a vertical "wall" along which the carrier 14 is to be rolled, as will be explained hereinafter. At the upper end of the legs of each of the posts 24R,L, 26R,L is mounted a pair of brackets 40 (FIG. 1). Each bracket has an abutment in the form of a notch 42 on an inside portion thereof. The notches 42 of each pair of brackets 40 are aligned when viewed from the end of the frame (FIG. 1) to define a socket for the reception of a pin on the carrier 14 as will be discussed.

Turning attention to FIGS. 1, 7, 8 and 8A, the carrier drum 14 comprises a rigid framework which defines an open-ended passage 50 into which a wagon may be introduced. The carrier framework comprises a pair of beams 52 at each end of the drum extending traversely of the carrier axis 20. Each pair of beams 52 is spaced to receive therebetween one of the beams 30 of the frame 12 to properly position and orient the carrier relative to the frame. A top plate 53 extends across the beams 52 to form a portion of a floor for supporting a wagon. A pair of spacer members 53A are secured to the underside of the plate 53 to contact the beams 30 and assure that a space is formed therebetween to receive cables 134, 134' which will be later described. A flange 54 is connected to the inner beam 52 of each pair and supports one end of a stack of plates 56 which form the remaining floor portion of the carrier. A plurality of transverse brace members 58 (FIG. 7) extend beneath the stack of plates 56 intermediate the pairs of beams 52 to support the stack of plates 56 when a trailer is driven thereacross.

Extending upwardly from the floor of the carrier 14 are a plurality of curvalinear guide structures 66. The guide structures 66 each comprise a pair of ring segments 67 which are spaced in the direction of the axis 20. Each ring segment 67 includes a relatively straight upright leg 68 and a curvalinear piece of angle iron 70.

Between associated pairs of the angle iron pieces 70 is connected a curved plate 72 which define travel guides for elements 110 of a carrier raising mechanism as will be discussed. Extending across the upper ends of each associated pair of angle iron pieces 70 is a horizontal cylindrical pin 74L, 74R which defines a portion of a pivot, the other portion being defined by the sockets 42 of the brackets 40. Thus, at each side of the carrier 14 there are two pairs of ring segments 67 and two contact pins 74 which are aligned when viewed from the end of the carrier (FIG. 1).

At each end of the carrier 14 a plurality of longitudinal horizontal reinforcing bars 76 are secured between upper ends of the upright legs 68 and extend across the passage 50. A reinforcing assembly is located along each side of the carrier and includes horizontal members 82 and a vertical member 84 (FIG. 7).

Extending across the upper end of each side of the carrier is a slide or chute 88 which can be detachable, if desired, so as to be removed for transport of the dumping mechanism. The chute is situated such that a surface 90 thereof aids in guiding the contents of the wagon during a dumping operation, as will be explained subsequently.

From the foregoing, it will be appreciated that the carrier 14 is at its rest position in FIG. 1 (solid lines) wherein the beams 52 of the carrier straddle the respective beams 30 of the frame 12, and the plate 53 rests thereon.

Mounted on each side of the frame 12 is a carrier-actuating mechanism for raising the carrier to a tilted position over either side of the frame 12. Alternately, the actuating mechanisms are operable to rotate the carrier about the axis 20 to dump directly therebeneath. Each actuating mechanism is identical and comprises a pair of cable-actuated booms (FIGS. 1, 3 and 4–6) spaced in a "longitudinal" direction parallel to the axis 20 of the carrier. Thus, a pair of longitudinally spaced booms 90R are located to one side of the carrier and a pair of longitudinally spaced booms 90L are located to the other side of the carrier. Each boom 90R,L is of the extensible/retractible type and includes a mounting portion 92 and a reciprocable portion 94 telescopingly arranged on the mounting portion 92 (FIGS. 3–6). The mounting portion 92 comprises a pair of spaced arms 96 secured together at their outer ends by a pair of flanges 98 (only one shown in FIG. 4) located on opposite sides of the reciprocable portion 92. At their inner ends the arms are secured together by a pin 100 which also connects the mounting portion 92 to a bracket on the frame and serves as a pivot coupling for the boom.

The reciprocable portion 94 of the boom comprises an arm 102 slidably disposed in a socket formed by the arms 96. The arm 102 includes pairs of flanges 104, 106 secured at a rear end thereof by means of bolts 108. The flanges extend on opposite sides of the mounting arms 96 so as to retain the rear end of the reciprocable arm 102 within the socket for sliding movement. The flanges 98 on the mounting arms 96 also retain the extensible arm 102 for sliding movement.

Mounted on a front end of the reciprocable arm 102 is a rotatable pulley 110. A pair of rotatable pulleys 112, 114 are mounted at a rear end of the reciprocable arm by means of a common axle 116 extending through the arm 102 (FIG. 5).

Mounted at the forward ends of the mounting arms 96 are a pair of rotary pulleys 118, 120 whose rotary axes are coincident. A single rotary pulley 122 is mounted at the bottom end of one of the mounting arms 96 and has a rotary axis which is parallel to that of the pulleys 118, 120. The rotary axes of the pulleys 110, 118, 120 and 122 are mutually parallel and parallel to the axis 20 of the carrier, whereas the rotary axes of the pulleys 112, 114 are oriented orthogonally relative to the other pulley axes.

Each boom 90R,L is pivotably attached to the frame 12 by means of the pin 100 such that the axis of rotation of the boom is parallel to the carrier axis 20.

The booms 90R on one side of the frame are arranged co-planar with respective booms 90L on the other side of the frame and also with respective guide structures 66 of the carrier 14. In this regard, the booms are normally located within the confines of the legs 36 of a respective post 26 in the retracted condition.

On each side of the frame 12 a cable system 129R, 129L is provided to simultaneously operate the pair of booms on that side (FIG. 2). In FIG. 2 only one set of booms 90R has been depicted, for purposes of clarity. Each cable system comprises a pair of winch drums 130, 132 which are arranged to be driven in unison by a conventional drive motor (not shown). A first cable 134 is wound upon the drum 130 and extends around a first pulley 136 mounted on the frame 12 and from there reverses direction and extends around a corner pulley 138 mounted at an end of the frame. The rotary axis of each of the pulleys 136, 138 is arranged vertically.

The first cable 134 then extends around the bottom pulley 122 of the mounting arms 96, and from there extends around the other pulleys 120, 114, 118, 112 and 110, in that order. From the pulley 110, the cable 134 extends downwardly into abutting contact with the guide members 72 of the associated guide structure 66 of the carrier. Continuing on, the cable 134 travels between the curved bars 70 of an associated ring structure 66, extends along a lower extent of the carrier, then upwardly in contact with the guide structure 66 on the opposite side of the carrier and is wound around one 72A of the guide members 72 located upwardly about one-third of the height of the opposite guide structure 66. From such guide tube 72A, the cable 134 extends further upwardly and is anchored to another 72B of the guide members 72 located upwardly about two-thirds the height of the opposite guide structure 66.

A second cable 134' extends from the drum 132 in a similar fashion relative to the other boom 90R on the same side of the frame, except that the cable 134' does not reverse direction around its associated first pulley 136A. It should be noted that for clarity in FIG. 2 the positions of the pulleys 110, 112, 114 are depicted as if the booms are extended. During normal operation of the actuating mechanism in that fashion, the carrier will be rotated out of the position depicted in FIG. 2. Such rotary displacement has not been depicted in order to retain clarity in the drawing.

Operation of the actuating mechanism will be discussed with further reference to FIGS. 16-19. Although only a single boom is depicted at each side of the carrier 14, it will be appreciated that one or more booms at each side are preferably employed. If the cable 134R of one of the cable systems 129R is wound-up on the drum 130 so as to shorten the effective length of the cable 134R, the pulleys 112, 114 of the boom 90R will be urged upwardly by the cable 134 so as to extend the reciprocable portion 94 outwardly of the mounting portion 92. Simultaneously the cable 134R will raise the carrier 14 and, in effect, rotate the carrier about its longitudinal axis 20 in a counterclockwise direction as viewed in FIG. 17. By simultaneously holding stationary the cable 134L of the boom 90L on the opposite side of the carrier (i.e., maintaining the cable 134L of fixed length), the carrier is constrained to roll upwardly along such fixed cable 134L whereby the latter forms a "climbing" cable for the carrier (the fixed cable 134L resists relative slippage between the wall and the carrier). That is, since the distance from the anchoring end (on the carrier) of the cable 134L to the top of the booms 90R remains fixed (because the cable 134L is held at constant length), rotation of the carrier solely about its axis 20 is prevented. Accordingly, the carrier 14 tends to "roll" along the fixed cable 134L. As the cable 134R is continulusly reeled-in, the reciprocable portion 94 gradually extends.

As the carrier thus rolls upwardly along the fixed cable 134L via combined rotational and translatory motion, the swivel pin 74L approaches and eventually enters the socket 42L (FIG. 18).

Thereafter, the boom 90R continues to extend to effect a rotation of the carrier about the swivel axis defined by the swivel pin 74L. This is permitted by the fixed cable 134L because the swivel axis of the pin 74L lies closely adjacent the pulley 110 of the boom 90L, i.e., the anchor point 72B of the fixed cable 134L rotates about a center defined essentially by the pin 74L or the point of contact of the fixed cable 134L with the pulley 110 of the boom 90L. During rotation of the carrier about the pin 74L, the boom 90R swivels about the pivot 100. Thus, a fulcrum of the cable 134, defined by the top pulley 110 of the boom 90R is displaced leftwards and upwards to continually hoist the carrier.

Winding of the cable 134R is preset to effect a counterclockwise rotational displacement of the carrier of preferably about 130-150 degrees from the rest position to the dumping position.

In the dumping position, the guide members 72A around which the actuating cable 134R is wrapped (FIG. 2) are located closely adjacent the pulley 110 of the extended boom 90R. Accordingly, further counterclockwise rotation of the carrier is prevented (since further rotation would require a lengthening of the cable 134R), thereby preventing the cable from rolling-off the frame 12. Preferably, in the dumping position, the combined center of gravity of the drum and wagon is located to the inside of the swivel axis defined by the pin 74L to minimize any roll-over tendencies.

During the last stages of travel of the carrier toward the dumping position, the upper pulley 110 of the extended boom 90R makes contact with, and is supported by, the plates 72 of the associated guide structure 66 (FIG. 19).

To return the carrier to the rest position, the drum 130 is slowly rotated to pay-out the cable 134R in a controlled manner, thereby lengthening the effective length of the cable and allowing the carrier to descend slowly through the effects of gravity.

To dump to the right side instead of the left, the cable 134L is wound-up while the cable 134R is held fixed.

While dumping to either side, it is not necessary that the fixed or "climbing" cable be connected to the non-extended boom. Rather, the climbing cable could simply be anchored at one end to the frame 12 adjacent the socket 42 (and anchored at its other end to the carrier at 72B). Thus, it is possible to provide a mechanism which dumps only to one side by using booms on one side of the frame and fixed cables on the other side. (If desired, fixed cables could be utilized in addition to booms at each side of the frame.)

It is also possible that, rather than employing separate cables 134R, 134L, a single cable could be employed whose opposite ends are wrapped around respective pairs of the right and left hand drums 130, 132. Thus the work of cables 134R, 134L could be performed by a single cable which is properly wound around the carrier at selected locations.

The booms 90R, 90L could be designed so as to be cable-extended for only a portion of their travel and thereafter actuated by different power, such as hydraulic power for example.

Figure 14:
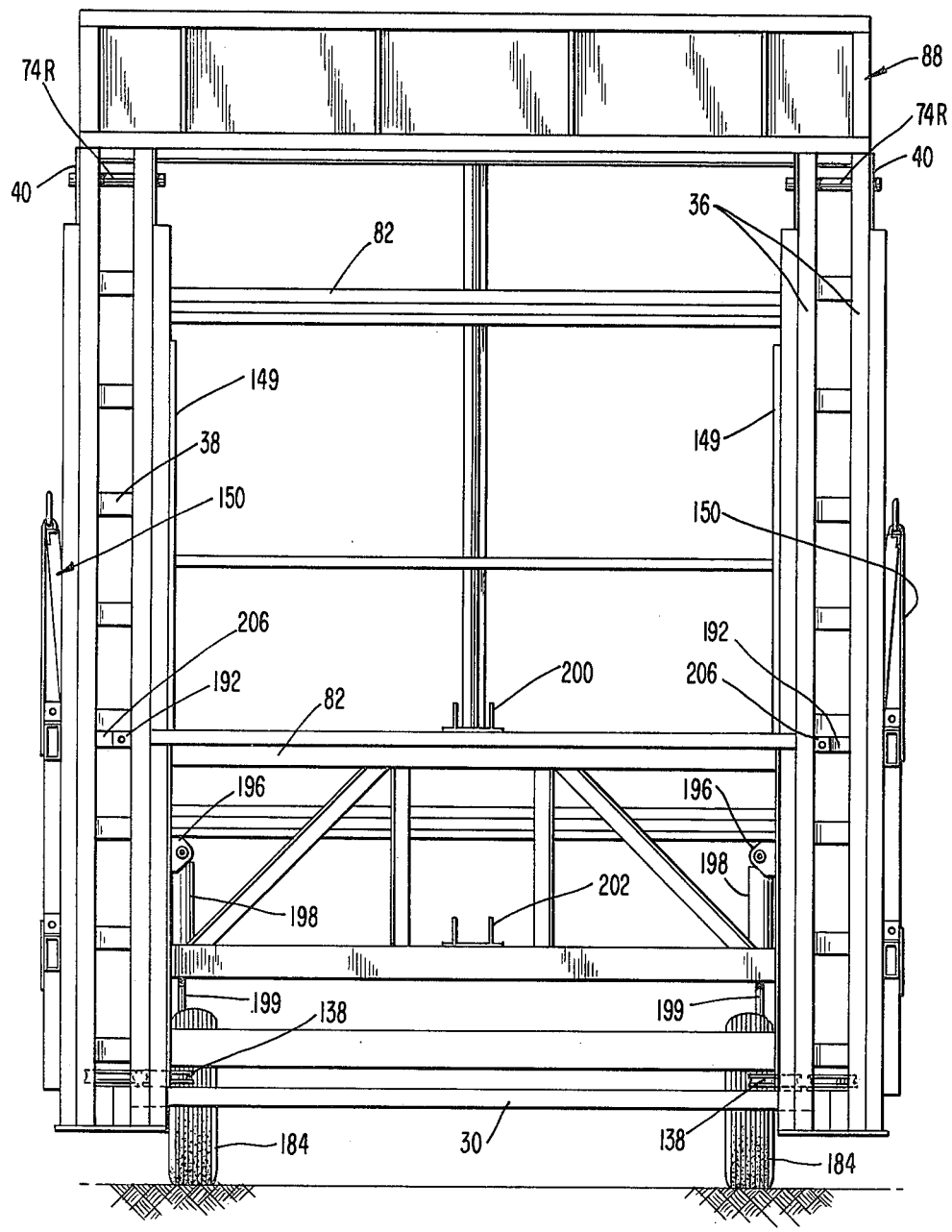
FIG. 14 is a side elevational view of the dumping mechanism in a highway transport condition.

In order to aid in retaining the carrier in proper position as it travels upwardly and downwardly, a pair of plates 149 are mounted to inside legs 68 of the posts 24R,L 26R,L (FIGS. 9 and 14). The plates extend vertically and serve as abutments for the inner ring segments of the guide structures 66 on the carrier.

The dumping mechanism of the present invention can, if desired, be actuated to dump directly beneath the carrier 12, i.e., by rotating the carrier 14 about its own longitudinal axis 20. This is accomplished by winding-in one cable 134R (or 134L) while paying-out the other cable 134L (or 134R). Since the cable 134L is being paid-out, there is, in effect, no "climbing" cable which constrains the carrier to travel upwardly along the side of the frame. Hence, the carrier rotates essentially about its own longitudinal axis 20 until the wagon is sufficiently inverted to dump the contents. To receive the contents, a pit or conveyor can be positioned beneath the frame 12.

In order to facilitate entry and exit of a wagon relative to the carrier 14, a pair of ramps 150 can be mounted on the ends of the carrier. Each ramp 150 is mounted by means of a horizontal hinge axis 152 (FIG. 7) formed by hinge brackets 153 mounted on an edge of the floor portion of the carrier 14, and mating hinge brackets mounted along an inner end of the ramp 150. Accordingly, the ramps 150 may each be swung downwardly to a generally horizontal loading position or swung upwardly to essentially vertical positions for transport (FIG. 14). The slides 88 depicted in FIG. 14 would be removed prior to transport. The ramps have inclined surfaces 154 upon which a wagon may travel. Normally, the size relationship between the wagon and carrier 14 is such that the wheels of the wagon will rest directly on the ramps 150 as the carrier is raised to its dumping position.

Each ramp 150 includes a fixture 151 at the upper end thereof to enable the ramp to be secured in a raised condition, as by means of a cable or chain.

Also mounted on each end of the carrier 14 are a pair of gates 160 (FIGS. 9 and 10). Each gate 160 includes inner and outer portions 162, 164 which are joined together along a vertical hinge axis 166. The inner portion 162 is joined to the carrier 14 by means of a vertical hinge axis 168. Accordingly, the gate may be arranged in an open position for receiving a wagon (FIG. 9), or collapsed about the pivot 166 and then swung inwardly about the pivot 168 to a travel position depicted in FIG. 14 in which the gate is disposed within the interior of the carrier.

During a dumping operation, as the carrier begins to turn about its axis, the wagon will be similarly turned and will gravitate into contact against the gate, the latter serving to stabilize and brace the wagon.

When the gate is swung outwardly to an open position (FIG. 10) a vertical extension 170 can be mounted on the gate to raise the height thereof if needed. Mounting of the extension can be in any suitable manner, such as by providing vertically depending pins on the extension 170 which are fitted into vertical sleeves on the gate portions. Alternatively, the gate and extension can be of one integral piece, with the hinge axis 166, 168 extending to the full height of the extension.

In order to provide for transport of the dumping mechanism 10, support wheels are provided which may be installed as needed to enable the dumping apparatus to be towed in any direction (i.e., in the direction of the drum axis 20 or transversely thereof). For this purpose, a pair of wheel assemblies 180 are provided which may be placed at the sides or the ends of the frame. In FIGS. 9, 10 and 13 the wheel assemblies are depicted at the sides of the apparatus for permitting movement of the mechanism within a yard, whereas in FIGS. 12, 14 and 15 the wheel assemblies are depicted at the ends of the mechanism to facilitate highway travel.

Each wheel assembly 180 comprises a main beam 182 to the ends of which are mounted tires 184 by means of axles 186 (FIG. 11). An upstanding post 188 is pivotally connected to the main beam 182 at a location intermediate the tires by means of a bracket 189 and a pivot pin 190 (FIG. 10). The post 188 is telescopingly received within an upstanding sleeve 191. The sleeve 191 includes a pair of vertically spaced bracket assemblies 192, 194 which are adapted for connection to the sides or ends of the frame as will be explained. Also mounted on the sleeve 191 intermediate the brackets 192, 194 is a bracket 196 to which is pivotally connected the cylinder end of a fluid ram 198. The rod end 199 of the ram 198 is pivotally connected to the lower end of the bracket 189. Thus, by extending or retracting the ram 198, the frame 12 can be raised or lowered relative to the ground.

At the sides of the frame 12 a pair of brackets 200, 202 are provided (FIGS. 13 and 14) which are adapted to be connected to the brackets 192, 194 of the wheel assembly 180. When the wheel assemblies 180 are located at the sides of the frame, the dumping mechanism can be moved in the direction of the drum axis 20 (FIG. 11) so that the apparatus can be transported on the highway. The carrier would be fixed to the frame, as by bolts or chains for example. Transporting can be accomplished with the ramps down (but above the ground) and the gates open.

Figure 15:
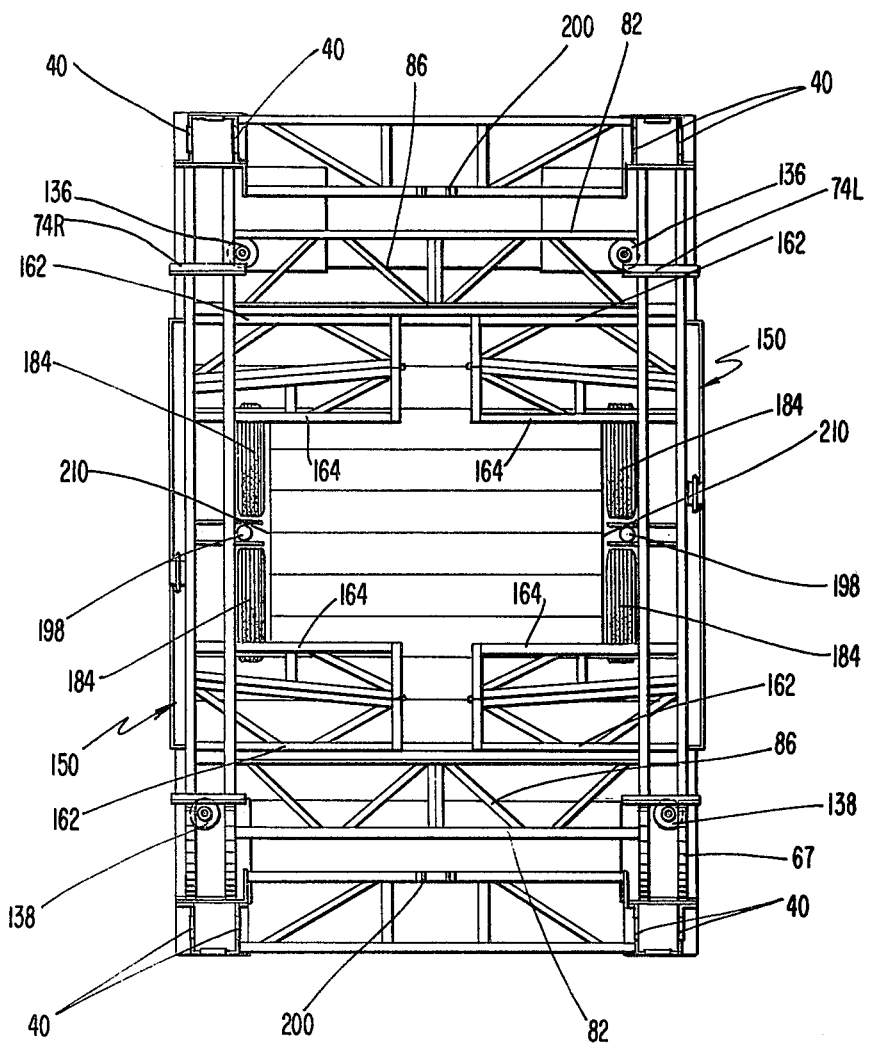
FIG. 15 is a plan view of the dumping mechanism in the highway transport position.

On each ramp 150 there are provided a pair of brackets 206, 206 (FIGS. 9, 11) to which the brackets 192, 194 of the wheel assembly 180 may be connected when the ramp is in a raised condition. The brackets 206, 208 extend inwardly with the ramp raised so that the wheels are located inwardly of the outer ends of the apparatus (to shorten the draft width) and are positioned within openings 210 formed in the floor of the carrier 14 (FIG. 15).

An optional, and perhaps more preferable, arrangement of the support wheels will be disclosed in connection with FIGS. 20–21. FIG. 21 depicts the left-most wheel assembly 250 as it would appear when viewed from the right in FIG. 9 (or it depicts the right-most wheel assembly of FIG. 9 as viewed from the left). As depicted in that embodiment, each wheel assembly 250 comprises a pair of wheels 251, 252 arranged coaxially. Such an assembly would be disposed within the openings 210 (FIG. 9) which would be somewhat enlarged as depicted in broken lines at 254 in FIG. 9. Each wheel assembly 250 includes telescoping arms 256, 258 the former being stationary and secured to a bracket 260 via flanges 262, and the latter being movable and secured to an axle 264 of the wheels 251, 252. The bracket 260 is rigidly connected via bolts 268, 270 to beams 272, 274 of the frame 12. A lift ram 276 is operably connected between a flange 278 on the stationary arm 256 and a flange 280 on the movable arm 258. Thus, by extending and retracting the ram 276, the wheels 251, 252 can be displaced to, respectively, raise and lower the apparatus.

An interconnecting brace 290 could be connected between the brackets 260 of the respective wheel assemblies when the latter have been mounted in their transport position.

In this regard, it will be appreciated that the brackets 260 are disconnected and stored until the apparatus is to be transported on the highway, whereupon they are attached to receive the wheel assemblies.

If desired, the enlarged openings 210 in the carrier floor could be provided with plates or inserts which cover the openings when dumping operations are underway so that the vehicles may travel over the openings.

It has been found that the coaxial arrangement of wheels described in connection with FIGS. 20–21 facilitates construction of an apparatus whose highway transport width is twelve feet or less, thereby avoiding the need for special permits for highway transport.

To summarize operation of the dumping mechanism, the mechanism is positioned alongside a module former 16 (FIGS. 1, 16). The mechanism can be moved about within a yard or field with the ramps 150 in a downward position and the gates 160 in an open position as depicted in FIG. 11, in order to be located from adjacent one module former to another. If the mechanism is being moved about with the ramps in an upward position and the gates in a closed position as depicted in FIG. 15, then once the mechanism has been positioned adjacent a module former, the ramps 150 are lowered and the gates 160 are opened to the position depicted in FIG. 10. The mechanism is lowered onto the ground through retraction of the hydraulic rams 198.

Thereafter, a container is displaced upwardly along one of the ramps 150 and onto the carrier 14 to which it is attached. With attention directed to FIGS. 16 through 19, the cable mechanism, including a boom 90R, located at a side of the carrier opposite the dumping side, is actuated so as to reel-in the cable 134R (as well as the cable 134R' not depicted in FIG. 16). The other cable 134L (as well as the not shown cable 134L') is held at fixed length. Accordingly, the carrier 14 rolls upwardly along the post 90L. Relative slippage between the carrier and the post is resisted by the cable 134L. Eventually, the pivot pin 74 enters the pivot slot 42 to define a rotational pivot axis for the carrier. Further reeling-in of the cable 134R causes the carrier to rotate about the pivot axis defined by the pivot portions 74, 42 (FIG. 19).

In this manner, the carrier is brought to a generally inverted position, enabling the contents of the container to gravitate into the module former 16.

Rotational movement of the carrier 14 about the pivot axis is facilitated by the pivotal connection of the boom 90R, whereby the boom swings leftwardly as viewed in FIG. 19. In the absence of such swinging of the boom, a still further vertical extension thereof would be necessary. Thus, the size of the boom is minimized by its ability to pivot.

It will be appreciated that the present invention enables containers to be dumped by means of a mechanism which is relatively short in height and narrow in width and easily transportable. By utilizing vertically extendible/collapsible booms which are mounted for rotation, the carrier can be raised to a substantial height by means of a raising mechanism which is of relatively short height when in the rest position.

The invention enables a carrier to be rolled along a substantially vertical axis, thereby minimizing the overall width of the mechanism, while assuring that the container can be raised to a considerable height above the ground in order to dump into a receiving container which is also of considerable height. Thus, it is unnecessary to provide a dumping mechanism which is initially positioned at a height substantially above the receiving container. Accordingly, the dumping mechanism can be utilized in a conventional yard or field. Moreover, transporting of the mechanism involves minimal difficulty due to the low height and narrow width thereof.

Although the invention has been described in connection with a preferred embodiment thereof, it will be appreciated by those skilled in the art that additions, substitutions, modifications and deletions not specifically described may be made without departing from the spirit and scope of the invention as defined in the appended claims.

What is claimed is:

1. A container dumping apparatus comprising:
a frame having first and second sides;
a carrier positioned on said frame for movement relative thereto, said carrier including means for supporting a container to be dumped,
a dumping means operably connected to said carrier and including actuating means selectively actuable:
in a first mode for raising and generally inverting said carrier at said first side of said frame to dump the contents of said container over said first side, and
in a second mode for raising and generally inverting said carrier at said second side of said frame to dump the contents of said container over said second side.

2. Apparatus according to claim 1, wherein said actuating means is actuable in a third mode for rotating said carrier essentially in-place about a longitudinal axis to dump the contents of said container directly therebeneath.

3. Apparatus according to claim 1, wherein said actuating means comprises cable means connected to said carrier and cable take-up means connected to said cable means for shortening the effective length thereof to cause said carrier to roll upwardly along a side of said frame.

4. Apparatus according to claim 3, wherein said cable take-up means comprises a drum.

5. Apparatus according to claim 1, wherein said actuating means comprises an extensible/collapsible boom comprising telescoped inner and outer portions, said inner portion mounted for pivotal movement on said frame, said inner and outer portions each carrying pulleys, a cable extending around said pulleys and anchored to said carrier, cable take-up means connected to said cable for shortening the effective length thereof to extend said outer boom portion and cause said carrier to rotate.

6. Apparatus according to claim 5, wherein said cable is anchored to said carrier at a second side thereof opposite the first side thereof which is adjacent said boom, and further comprising a second cable connected to said frame adjacent said second side of said carrier and anchored to said first side of said carrier, the effective length of one of said cables being held fixed while that of the other is shortened to cause said carrier to roll upwardly along said other cable and one of said walls of said frame.

7. Apparatus according to claim 1, wherein said actuating means comprises a first cable connected to a first side of said carrier, a second cable connected to a second side of said carrier, and cable take-up means connected to said first cable for shortening the effective length of the latter and causing said carrier to roll upwardly along said second cable and one of said side walls to a generally inverted position.

8. Apparatus according to claim 1, wherein said frame has means defining a first portion of a pivot, said carrier having means defining a second portion of a pivot, said actuating means being operable to raise said carrier to engage said first and second pivot defining portions and thereafter swing said carrier around a pivot formed by said pivot defining portions, to generally invert said carrier and cause the contents of the container to gravitate therefrom.

9. Apparatus according to claim 1, wherein said carrier is open-ended and includes a floor for supporting a container to be dumped and a curvalinear guide structure at each side thereof having its convex side facing a respective side wall of said frame, one of said guide structures engaging and rolling upwardly along its respective side wall of said frame during a dumping operation.

10. Apparatus according to claim 9, wherein a slide is disposed along the upper end of each side of said carrier to guide the contents of the container as such contents gravitate from the container.

11. Apparatus according to claim 9, wherein a ramp is connected to each end of said carrier by a horizontal pivot, said ramp being lowerable onto the ground and including an inclined surface for guiding a wheeled container into said carrier.

12. Apparatus according to claim 9, wherein a pair of gates are connected to each side of said carrier by a vertical pivot, said gates each including inner and outer sections interconnected by a vertical pivot enabling said gates to be collapsed.

13. Apparatus according to claim 9, further including a pair of detachable wheel assemblies, and coupling means at both ends and both sides of said frame for enabling said wheel assemblies to be connected selectively at the sides and end of said frame, said wheel assemblies each including power means for raising and lowering said frame.

14. Apparatus according to claim 13, wherein each wheel assembly includes a plurality of wheels mounted on a common axis.

15. A container dumping apparatus comprising:
a frame having at least one upstanding side,
a carrier positioned on said frame for movement relative thereto, said carrier including means for supporting a container to be dumped,
cable means for displacing said carrier, said cable means comprising:
a first cable section connected to a first location on said carrier,
a second cable section connected to a second location on said carrier, and
cable take-up means connected to said cable means for shortening the effective length of said first cable section and causing said carrier to roll upwardly along said second cable section and said side of said frame to a generally inverted position.

16. Apparatus according to claim 15, wherein said frame includes an additional upstanding side, said first and second cable sections comprising separate cables, additional cable take-up means connected to said second cable section for shortening the length of the latter and causing said carrier to roll upwardly along said first cable and said additional upstanding side to a generally inverted position.

17. Apparatus according to claim 16, wherein both of said cable take-up means includes a drum for winding-up or paying-out cable such that by paying-out one of said cables and winding-up the other of said cables, said carrier is rotated in-place about its longitudinal axis.

18. Apparatus according to claim 15, wherein said cable take-up means comprises an extensible/retractible boom including telescoped inner and outer portions, said inner portion being mounted to said frame for pivotal movement about a horizontal axis, said inner and outer portions each carrying pulleys, said first cable extending around said pulleys and anchored to said carrier and means for shortening the effective length of said cable to extend said outer boom portion and cause said carrier to rotate.

19. Apparatus according to claim 15, further including a pair of detachable wheel assemblies, and coupling means at both ends and both sides of said frame for enabling said wheel assemblies to be connected selectively at the sides and ends of said frame, said wheel assemblies each including power means for raising and lowering said frame.

20. Apparatus according to claim 19, wherein each wheel assembly includes a plurality of wheels mounted on a common axis.

21. A container dumping mechanism comprising:
a frame including an upwardly extending wall having means defining a first portion of a pivot,
a carrier including means for supporting a container to be dumped and having means defining a second portion of a pivot,
actuating means for rolling said carrier upwardly along said wall to mutually engage said first and second pivot defining portions and thereafter swinging said carrier around a pivot formed by said pivot defining portions, to generally invert said carrier and cause the contents of the container to gravitate therefrom, and
means separate from said wall and movable relative thereto for supporting said carrier during rolling movement thereof to resist relative slippage between said carrier and said wall.

22. Apparatus according to claim 21, wherein said wall comprises an upstanding post carrying said first pivot portion in the form of a socket, said second pivot portion comprising a pin carried by said carrier.

23. Apparatus according to claim 22, wherein said carrier includes a smoothly curved side portion which rollingly engages said wall.

24. Apparatus according to claim 21, wherein said frame includes an additional wall located at a side of said frame opposite said first-named wall said additional wall including means defining a first pivot portion, said actuating means being operable to displace said carrier selectively toward either of said walls of said frame.

25. A container dumping mechanism comprising:
a frame including a substantially vertical wall,
a carrier including means for supporting a carrier to be dumped,
a cable connected at one end to said carrier and at another end to a take-up means,
an extensible/collapsible boom connected at a lower end to said frame for pivotal movement about a generally horizontal axis, said boom including pulleys, said cable being wrapped around said pulleys, and
said take-up means being operable to shorten the effective length of said cable to extend said boom and roll said carrier inwardly along said wall to a container inverting position.

26. Apparatus for unloading the contents of a portable container, said apparatus comprising:
a frame comprising
means forming first and second sides, and
abutment means forming one portion of a pivot above and on said first side of said frame; and
a carrier supported on said frame between said first and second sides, said carrier having first and second sides and being movable between a rest position and a generally inverted dumping position and comprising:
means for supporting a portable container, and
contact means mounted adjacent an upper end of a first side of said carrier disposed adjacent said first side of said frame, said contact means forming another portion of a pivot complimentary to said pivot portion formed by said abutment means;
actuator means for displacing said carrier relative to said frame comprising:
extensible/collapsible boom means located adjacent said first side of said frame, said extensible boom means comprising an inner portion pivotably attached to said frame and
an outer portion mounted on said inner portion for extensible and retractible movement relative thereto,
said inner portion carrying pulley means, and said outer portion carrying pulley means,
cable means for actuating said boom means and comprising:
cable take-up means, and
a first cable having one end anchored to said take-up means, and extending around said pulley means on said inner and outer boom portions, and extending downwardly from said outer boom portion and having another end anchored to said second side of said carrier,
a second cable having one end anchored adjacent said second side of said frame and extending downwardly therefrom and having another end anchored to said first side of said carrier, and
means for operating said take-up means to shorten the effective length of said first cable to cause said outer portion of said first boom means to extend upwardly and generally toward said second side of said frame, and cause said carrier to roll upwardly along said second cable means and said first side of said frame to bring said contact means into engagement with said abutment means so as to form a pivot about which said carrier is thereafter rotated toward said generally inverted dumping position to empty the contents of a container supported on said carrier.

27. Apparatus according to claim 26, further including a second abutment means forming a portion of a pivot on said second side of said frame opposite said first side; second contact means mounted adjacent an upper end of said second side of said carrier disposed adjacent said seconds side of said frame, said second contact means forming another portion of a pivot complimentary to said pivot portion formed by said second abutment means; second extensible/collapsible boom means located adjacent said second side of said frame, said second extensible boom means comprising an inner portion pivotably attached to said frame and an outer portion mounted on said inner portion for extensible and collapsible movement relative thereto; said inner portion of said second boom means carrying pulley means; second cable means for actuating said second boom means and comprising second cable take-up means, and said second cable having one end anchored to said second take-up means, and extending around said pulley means on said last-named inner and outer boom portions, and extending downwardly from said last-named outer boom portion and having another end anchored to said first side of said carrier.

28. A method of emptying a mobile wheeled container comprising the steps of:
positioning said container in a carrier which is mounted on a frame,
rotating the carrier upwardly along a substantially vertical side of said frame about a continually translating axis of rotation, and thereafter rotating the carrier about a substantially stationary axis of rotation to generally invert said carrier and said container and dump the contents of the container over the top of said vertical side.

29. A method according to claim 28, wherein said first-named rotating step is performed until a pivot forming means on said carrier contacts a cooperating pivot forming means on said side of said frame to form said stationary axis of rotation.

30. A method according to claim 29, wherein said rotating steps each include shortening the effective length of a cable which is mounted to a telescoping boom that forms a fulcrum for said cable, and extending said boom in a manner displacing said fulcrum generally toward said side of said frame to displace said carrier toward such side.

31. A method according to claim 28, including the steps of shortening the effective length of a first cable attached to a first side of said carrier while simultaneously maintaining constant the effective length of a second cable attached to a second side of said carrier to cause said carrier to roll upwardly along said second cable and said side of said frame.

32. A method of emptying a mobile wheeled container comprising the steps of positioning said container in a carrier which is mounted on a frame, and shortening the effective length of a first cable attached to a first side of said carrier while simultaneously maintaining constant the effective length of a second cable attached to a second side of said carrier to cause the carrier to roll upwardly along said second cable and a side of said frame to a generally inverted position.

* * * * *